United States Patent [19]

Merstallinger et al.

[11] Patent Number: 4,568,152
[45] Date of Patent: Feb. 4, 1986

[54] SYSTEM FOR REFLECTING AN IMAGE INTO A MICROSCOPE

[75] Inventors: Kurt Merstallinger; Klaus Schindl, both of Vienna, Austria

[73] Assignee: C. Reichert Optische Werke, AG, Vienna, Austria

[21] Appl. No.: 505,513

[22] Filed: Jun. 17, 1983

[30] Foreign Application Priority Data

Jun. 22, 1982 [DE] Fed. Rep. of Germany ....... 3223157

[51] Int. Cl.[4] ................. G02B 21/00; G02B 27/34; G02B 27/36
[52] U.S. Cl. ................. 350/507; 350/502; 350/576; 350/174; 356/252
[58] Field of Search ........ 350/507, 502, 508, 523–527, 350/174, 576; 356/252

[56] References Cited

U.S. PATENT DOCUMENTS

| | | | | |
|---|---|---|---|---|
| 4,057,318 | 11/1977 | Schindl | | 350/502 |
| 4,281,923 | 8/1981 | Friedman | | 350/517 |
| 4,302,087 | 11/1981 | Reinheimer et al. | | 350/502 |
| 4,303,340 | 12/1981 | Hoffman | | 350/508 |
| 4,473,293 | 9/1984 | Phillips | | 355/45 |

FOREIGN PATENT DOCUMENTS 2933627  3/1980  Fed. Rep. of Germany ...... 350/174

Primary Examiner—Jon W. Henry
Attorney, Agent, or Firm—Alan H. Spencer; Stephen Raines; Gary M. Nath

[57] ABSTRACT

A marking image control system for a microscope arrangement in which the image of a marking on a mask is reflected into the optical path and combined with an object image of the microscope, the system forming an intermediate image of the marking in order to facilitate shifting of the image of the marking in a film plane or a viewing plane of the microscope.

8 Claims, 2 Drawing Figures

SYSTEM FOR REFLECTING AN IMAGE INTO A MICROSCOPE

BACKGROUND OF THE INVENTION

This invention relates to a system for combining an image, for projecting back-illuminated masks onto a film plane and/or a viewing plane of a microscope.

U.S. Pat. No. 4,057,318 discloses a technique whereby markings on back-illuminated masks are reflected into a microscope. The markings comprise transparent areas on an otherwise opaque film, these areas taking the form, for example, of ruled grids, numerals, scales, and similar symbols, so that these markings appear as bright features on the bright image of the object. The markings are illuminated with a so-called Kohler-type illuminating unit in a manner such that an image of the filament of the illuminating lamp is formed as complete as is possible, via a light collector, in the entrance pupil of the microscope. The image of the marking lies in front of the collector, covering the entire film field or viewing field of the microscope, the size of these fields being dependent on that of the entrance pupil of the microscope.

Since the marking cannot be larger than the light collector, and since, for technical reasons, the collector cannot be made to any desired size, the marking, which generally covers only a portion of the mask, must be very small. This causes difficulty in manufacture. Manipulation of the masks, for example by shifting or rotating them, or by exchanging them, is also an extremely difficult operation which is not simple to carry out since the movements involved are also necessarily very small.

OBJECT OF THE INVENTION

An object of the present invention is to provide an arrangement for combining an image of a marking with an object image which considerably facilitates manipulation of the image of the marking and also permits the possibility of using considerably larger markings on the mask.

BRIEF DESCRIPTION OF THE INVENTION

According to the present invention we provide a marking image control system for a microscope having a film plane and/or a viewing plane and optical means for combining a marking image, the system comprising an attachment which can form an intermediate image of a marking on a mask so that the image of the marking in the film plane or the viewing plane of the microscope can be shifted.

The marking image control system may be an attachment unit which is separate from the microscope and which, due to its larger field of observation, permits the use of larger markings on the mask. Moreover, the masks themselves can be larger so that they can be manipulated more easily. In particular, it is possible to use large masks possessing markings which can be adjusted in the viewing and/or film planes by means of a shifting mechanism. It is also possible, without difficulty, to produce master tolerance-images for users of the microscope without recourse to outside facilities.

A Kohler-type illuminating unit is preferably used for illuminating the mask, in which case the image of the filament of the illuminating lamp is formed in the entrance pupil of the marking image control attachment.

Since the marking image control attachment possesses a field of observation which, projected onto the film plane or the viewing plane of the microscope, can, without difficulty, be considerably larger than a mask located on the other side of the light collector of the Kohler-type illuminating unit, the markings on the mask can, in an extreme case, be as large as the mask. The markings can be reflected into a partial region of the field of observation of the microscope, the ratio of the size of this partial region to the entire field of observation of the microscope being equal to the ratio of the size of the mask, to the field of observation of the marking image control attachment. Furthermore, since the Kohler-type illuminating arrangement still illuminates only a partial area in the field of observation of the microscope, contrary to the state of the art, the brightness of the marking is increased in the same proportion, which is of particular importance in the case of bright object fields.

If the Kohler-type illuminating unit illuminates only a fraction of the field of observation of the microscope, or if the size of the mask is only a fraction of the size of the field of observation of the marking image control attachment, means may be provided, with advantage, whereby the image of the mask can be shifted over the entire field of observation of the microscope.

These means can, for example, be a mounting containing the lens and the entrance pupil which can be shifted inside a fixed housing of the marking image control attachment. Thus, starting from a central position of the mask in relation to the attachment, small displacements of the lens and entrance pupil, such that the formation of the image of the filament of the lamp in the Kohler-type illuminating unit remains virtually in the entrance pupil of the attachment, have the same effect in proportion to the converse reduction of the attachment as displacements of the mask which are carried out in the field of observation of the attachment.

Instead of shifting the lens and the entrance pupil of the attachment, it is also possible to shift the mask or, if appropriate, the Kohler-type illuminating unit. The mask is shifted at right-angles to the optical axis, while at the same time tilting the mask or unit so that the filament-image always falls into the entrance pupil of the attachment.

In one embodiment of the invention the Kohler-type illuminating unit and the mask is arranged to move on a part-spherical surface with the entry pupil of the attachment located at the center of curvature of the surface.

The system can include a device for adjusting the vertical position of the mask. Alternatively, the marking image control attachment can also include a zoom lens, or it can be designed to take interchangeable lenses. In all these cases, it is possible to alter the linear magnification of the marking image control attachment in the viewing planes of the microscope, thus enabling the markings on the mask to be made larger or smaller.

BRIEF DESCRIPTION OF THE DRAWINGS

Further features, details, and advantages of the invention will be apparent from the following description of two illustrative embodiments made with reference to the drawing, in which.

DETAILED DESCRIPTION OF THE INVENTION

Figure 1:
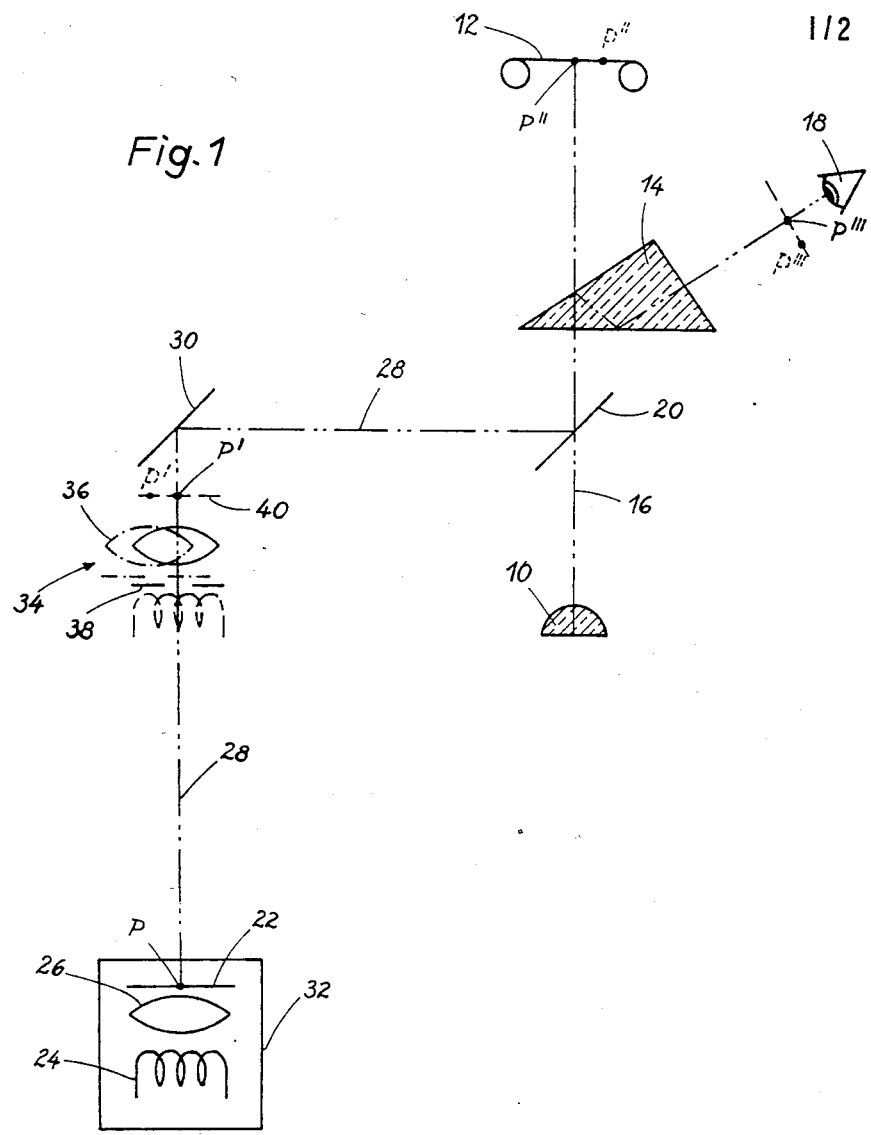
FIG. 1 is a diagrammatic representation of a first embodiment of the invention.

In the drawings, a microscope comprises an objective 10, a prism 14 for splitting an object beam 16 and reflecting a portion of the beam to a viewing point 18. A photographic camera having a film plane is provided at 12.

A semi-transparent mirror 20 is arranged between the prism 14 and the objective 10 to enable markings, such as grid markings or other symbols, to be reflected into the object beam 16.

A marking arrangement 32 comprises a mask and an illuminating arrangement therefor. The markings are applied to a mask 22, as transparent areas on an opaque, back-illuminating film. A Kohler-type illuminating arrangement for the mask 22 comprises a light-emitting filament 24 and a collector 26.

The marking beam 28 is deflected by means of a mirror 30, before striking the semi-transparent mirror 20, so that the mask and the object lie parallel to one another.

In the prior art, the light collector 26 forms an image of the filament 24 in the entrance pupil of the microscope so that the light is utilized in the most effective manner. In such an arrangement, the mask is located in a plane which is conjugated with respect to the film plane and/or the eyepiece plane of the microscope.

In accordance with the present invention an attachment 34 is provided between the mask arrangement 32 and the mirror 20 for combining the markings on the mask 22. The marking image control attachment 34 essentially comprises an entrance pupil 38 and a lens or lens assembly 36 arranged to form an image of the point P on the mask 22 as P' in a plane 40, which image is also formed, by means of the optical system of the microscope, in the film plane of the microscope as P", and in the eyepiece plane as P'''. The light collector 26 of the illuminating arrangement forms an image of the filament 24 in the entrance pupil 38 of the marking image control attachment 34. Since the image of the filament will be slightly larger than the aperture of the entrance pupil 38, the images P', P", and P''' of the point P can be shifted, in the film plane or in the viewing plane, by a slight shifting of the marking image control attachment in the lateral direction. Thus, by manipulating the attachment in this way, a marking, such as a grid marking or a symbol, can be reflected, without difficulty, into that portion of the object image which is desired in the particular case.

The marking image control attachment can be designed in the form of a drawing/copying apparatus, and permits the mask to be manipulated in an essentially unimpeded manner, as well as permitting the markings on the mask to be enlarged since they are reduced in size by the attachment. The reduction in size, brought about by the marking image control attachment, can be varied by altering the distance between the mask arrangement and the marking image control attachment. Alternatively, it is also possible to design the lens assembly so that it is interchangeable.

Figure 2:
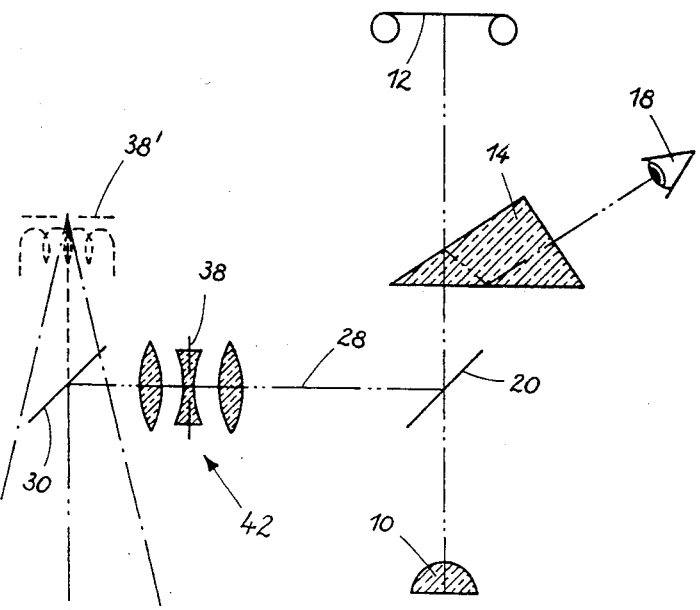
FIG. 2 is a diagrammatic representation of a second embodiment of the invention.
Figure 2:
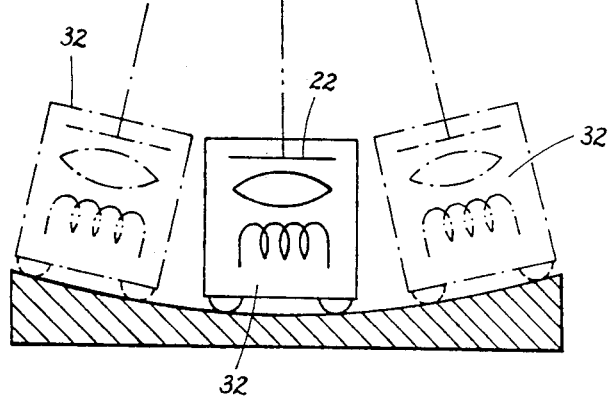

A second embodiment of the invention is shown in FIG. 2. A zoom lens 42 is provided in place of the simple lens 36, and the entrance pupil, in which the image of the filament 24 is formed, is integrated into the lens system and is inaccessible from the outside. The zoom lens 42 is fitted between the deflecting mirror 30 and the mirror 20, for combining the markings. In this embodiment it is difficult to shift the zoom lens laterally in order to be able to form an image of the mask 22 at different positions on the image of the object in the film plane or in the viewing plane. In order to achieve this effect the marking arrangement 32 is arranged to be shifted laterally, together with the illuminating arrangement. During the shifting operation, care should be taken to ensure that the image of the filament 24 is always formed in the entrance pupil 38 of the zoom lens 42.

It is a further feature of this invention to mount the marking arrangement 32 in a manner which facilitates shifting on a circular path centered on the reflected entrance pupil 38' of the marking image control attachment. In FIG. 2 of the drawings the marking arrangement 32 is arranged to be movable on a spherical surface centered on the plane of the reflected entrance pupil 38'.

The number of marking-images formed should always be such that the orientation of the movement of the marking arrangement 32 coincides with the orientation of the movement of the marking-image in the film plane or in the viewing plane in order to facilitate the manipulation of the mask.

The marking image control attachment can form part of a drawing-copying apparatus of a known type.

The marking image control attachment can be provided as a separate unit for use with a microscope, or it may be built into the microscope. The term "film plane", as used herein, refers to the plane in which an image is formed for detection by means such as a photographic recording medium.

We claim:

1. A reticle projection system suitable for use in projecting a reticle image to a selected location in a microscope image plane, which comprises an optical axis, a light source at one end of said optical axis, a collector lens system, a reticle fixed relative to said optical axis and an entrance pupil positioned in sequence on said optical axis, said collector lens system being adapted to substantially fill said entrance pupil with an image of said light source, means to move the reticle image to a selected location in the microscope image plane, said means comprising a lens orthogonally displaced in a plane perpendicular to said optical axis, said lens being positioned on said optical axis after said entrance pupil.

2. The reticle projection system of claim 1 wherein said means to project the reticle image includes said lens.

3. The reticle projection system of claim 1 further including zoom means to vary the size of the reticle image.

4. A reticle projection system suitable for use in projecting a reticle image to a selected location in a microscope image plane, which comprises an optical axis, a light source at one end of said optical axis, a collector lens system, a reticle fixed relative to said optical axis and an entrance pupil positioned in sequence on said optical axis, said collector lens system being adapted to substantially fill said entrance pupil with an image of said light source, means to move the reticle image to a selected location in the microscope image plane; a portion of the optical axis extending from said light source to said entrance pupil, including said collector lens system and said reticle, being pivotably movable about a center of rotation located in the entrance pupil.

5. The reticle projection system of claim 4 wherein said light source, collector lens system and reticle are assembled as a unit, said unit being adapted for movement about a spherical surface and said spherical surface having a center of curvature located in said entrance pupil.

6. The reticle projection system of claim 5 further including zoom means to vary the size of the reticle image.

7. The reticle projection system of claim 4 further including zoom means to vary the size of the reticle image.

8. A reticle projection system suitable for use in projecting a reticle image to a selected location in a microscope image plane, which comprises an optical axis, a light source at one end of said optical axis, a collector lens system, a reticle fixed relative to said optical axis and an entrance pupil positioned in sequence on said optical axis, said collector lens system being adapted to substantially fill said entrance pupil with an image of said light source, means to move the reticle image to a selected location in the microscope image plane; and a zoom means to vary the the size of the reticle image.

* * * * *